(No Model.) 10 Sheets—Sheet 1.

P. O. JOHNSON.
KNITTING MACHINE.

No. 596,299. Patented Dec. 28, 1897.

Witnesses:
N. M. Ward
E. Behel

Inventor:
Peter O. Johnson
By E. O. Behel
Atty.

(No Model.)  10 Sheets—Sheet 2.

P. O. JOHNSON.
KNITTING MACHINE.

No. 596,299. Patented Dec. 28, 1897.

Witnesses:
N. M. Ward
E. Behel

Inventor:
Peter O. Johnson
By A. O. Behel
Atty.

(No Model.)
P. O. JOHNSON.
KNITTING MACHINE.
No. 596,299.
10 Sheets—Sheet 3.
Patented Dec. 28, 1897.
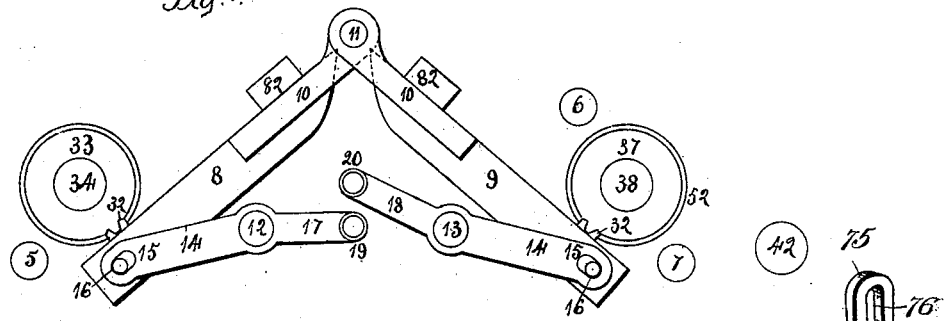
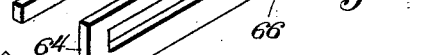
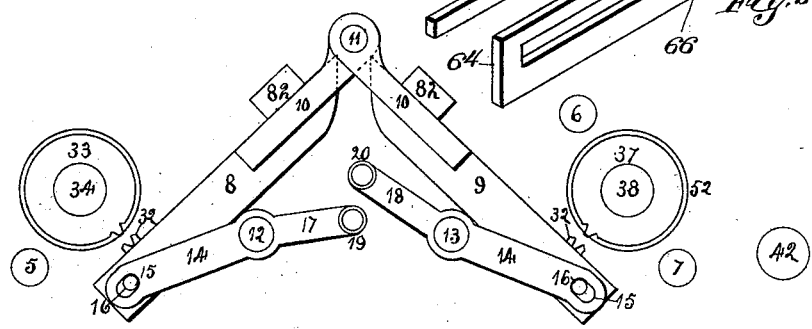
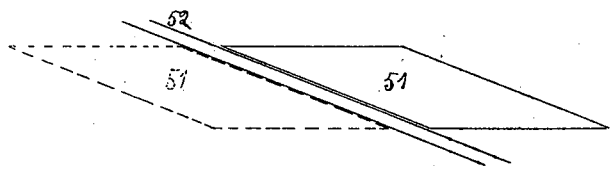
Witnesses:
N. M. Ward
E. Behel
Inventor:
Peter O. Johnson
By A. O. Behel
Atty.

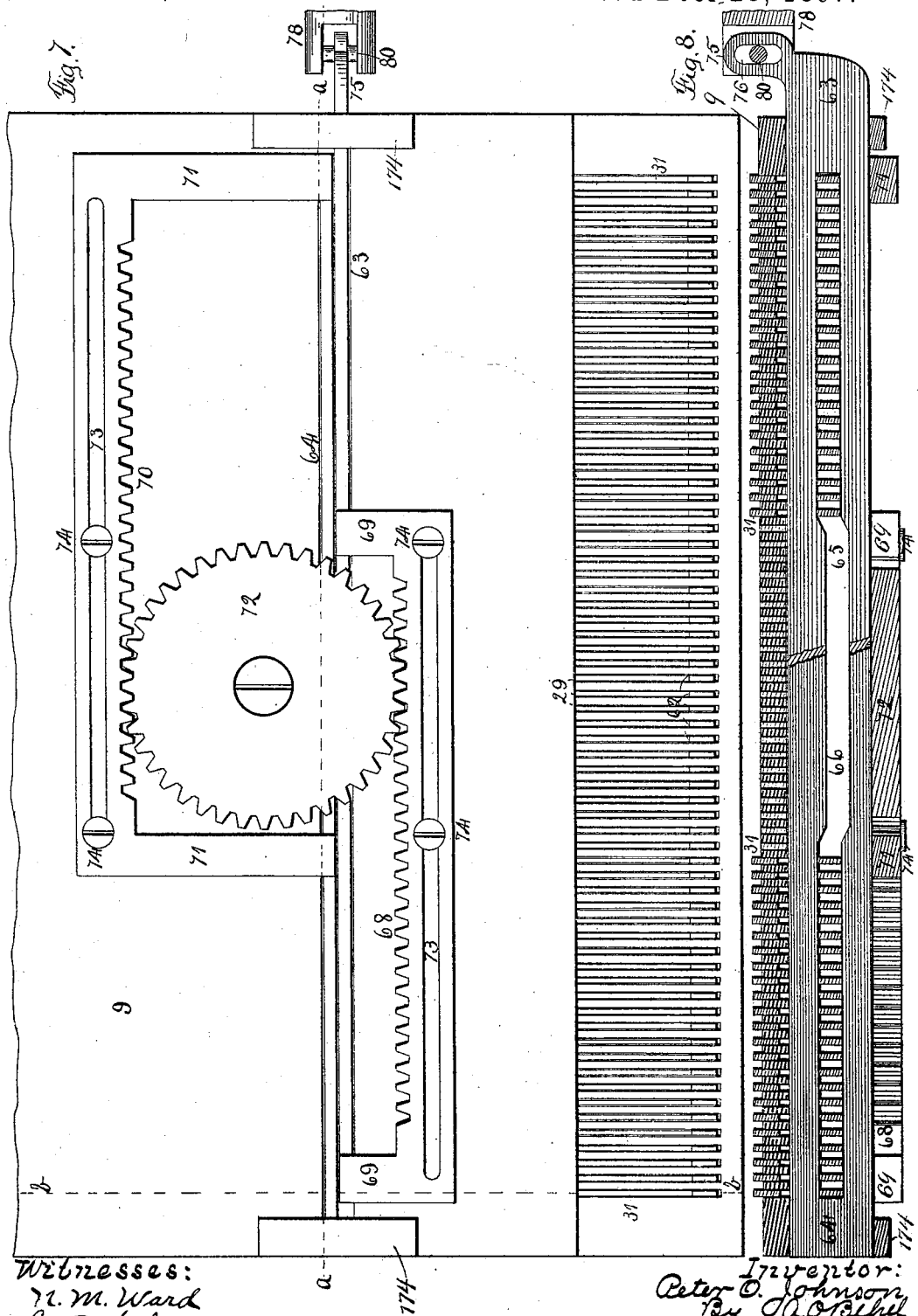

(No Model.) 10 Sheets—Sheet 5.

P. O. JOHNSON.
KNITTING MACHINE.

No. 596,299. Patented Dec. 28, 1897.

Witnesses:
N. M. Ward
E. Behel.

Inventor:
Peter O. Johnson
By A. O. Behel
Atty.

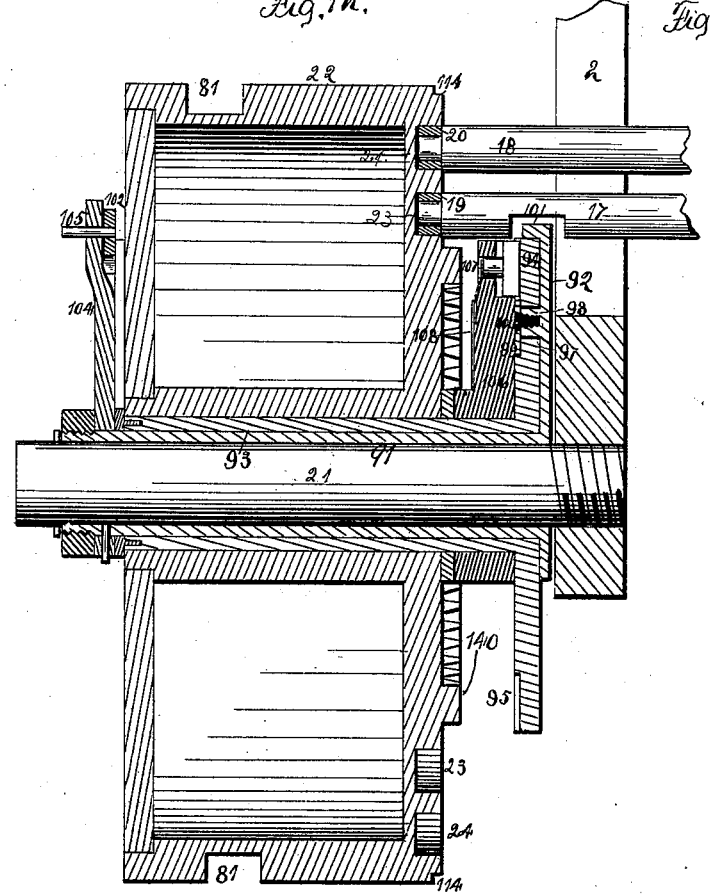

(No Model.)
P. O. JOHNSON.
KNITTING MACHINE.
No. 596,299. Patented Dec. 28, 1897.
10 Sheets—Sheet 7.
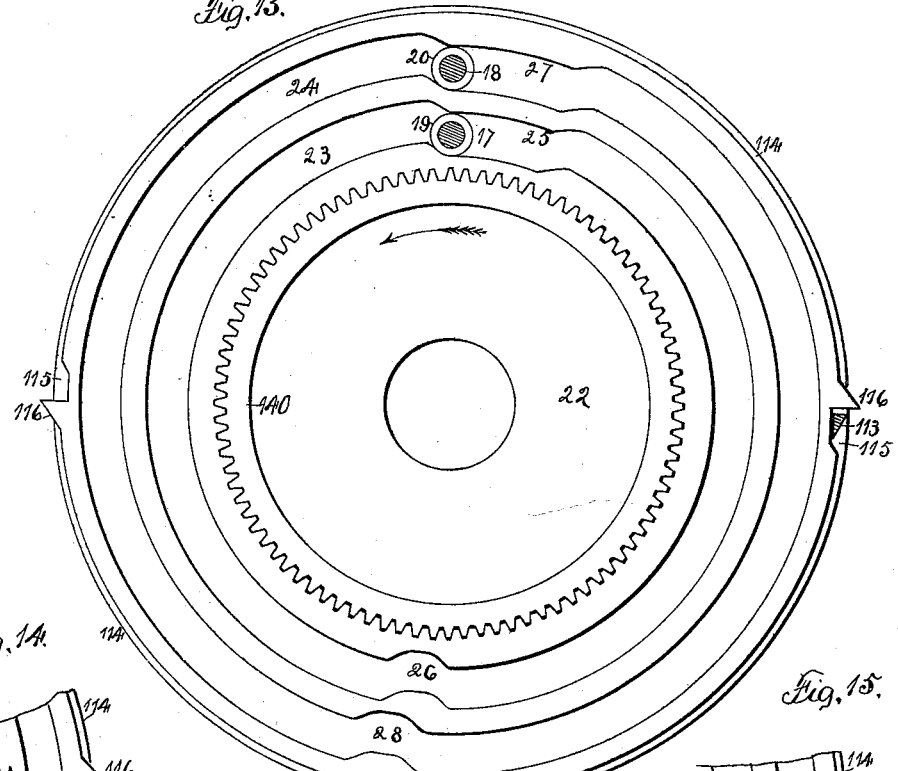
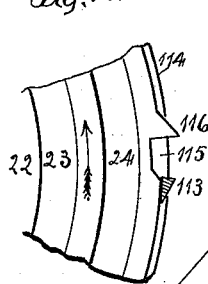
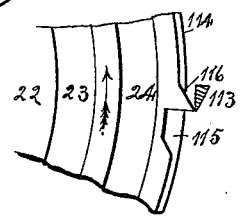
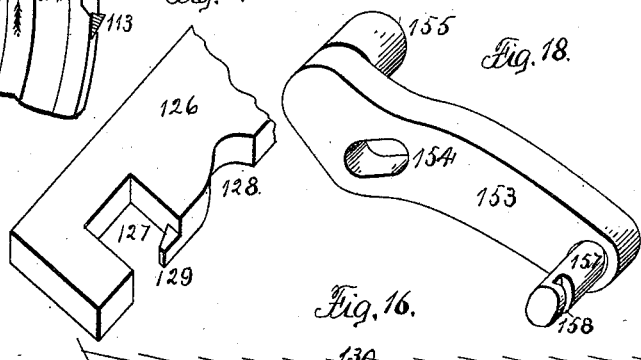
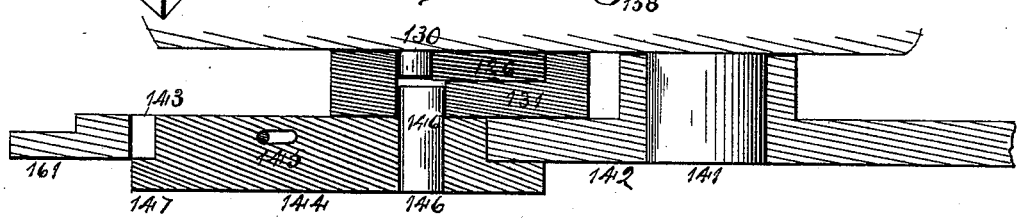
Witnesses:
N. M. Ward
E. Behel
Inventor:
Peter O. Johnson
By A. O. Behel
Attys (No Model.)  
P. O. JOHNSON.  
KNITTING MACHINE.  
No. 596,299. Patented Dec. 28, 1897.

10 Sheets—Sheet 8.

Witnesses:  
N. M. Ward  
E. Behel

Inventor:  
Peter O. Johnson  
By A. O. Behel  
Atty

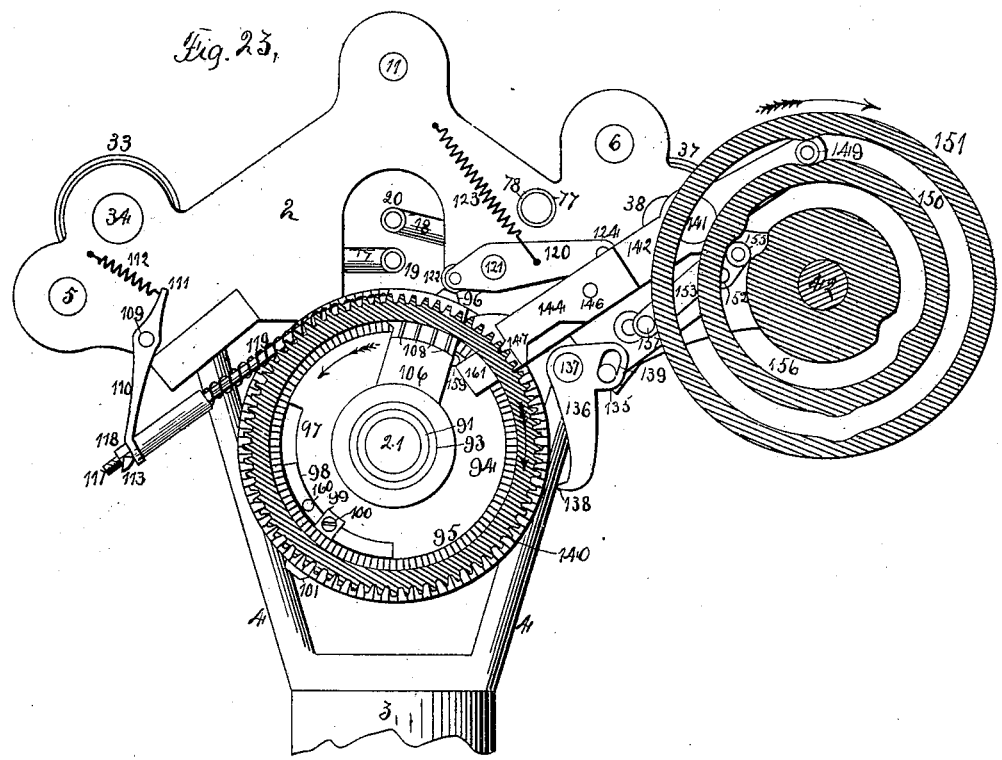

(No Model.)  
10 Sheets—Sheet 10.

P. O. JOHNSON.
KNITTING MACHINE.

No. 596,299. Patented Dec. 28, 1897.

Witnesses:
N. M. Ward
E. Behel

Inventor:
Peter O. Johnson
By A. O. Behel
Atty

UNITED STATES PATENT OFFICE.

PETER O. JOHNSON, OF ROCKFORD, ILLINOIS.

KNITTING-MACHINE.

SPECIFICATION forming part of Letters Patent No. 596,299, dated December 28, 1897.

Application filed May 23, 1896. Serial No. 592,728. (No model.)

*To all whom it may concern:*

Be it known that I, PETER O. JOHNSON, a subject of the King of Sweden and Norway, residing at Rockford, in the county of Winnebago and State of Illinois, have invented certain new and useful Improvements in Knitting-Machines, of which the following is a specification.

This invention relates to that class of knitting-machines known as the "straight-knitting" machines; and it consists in the details of construction hereinafter described.

Figure 1:
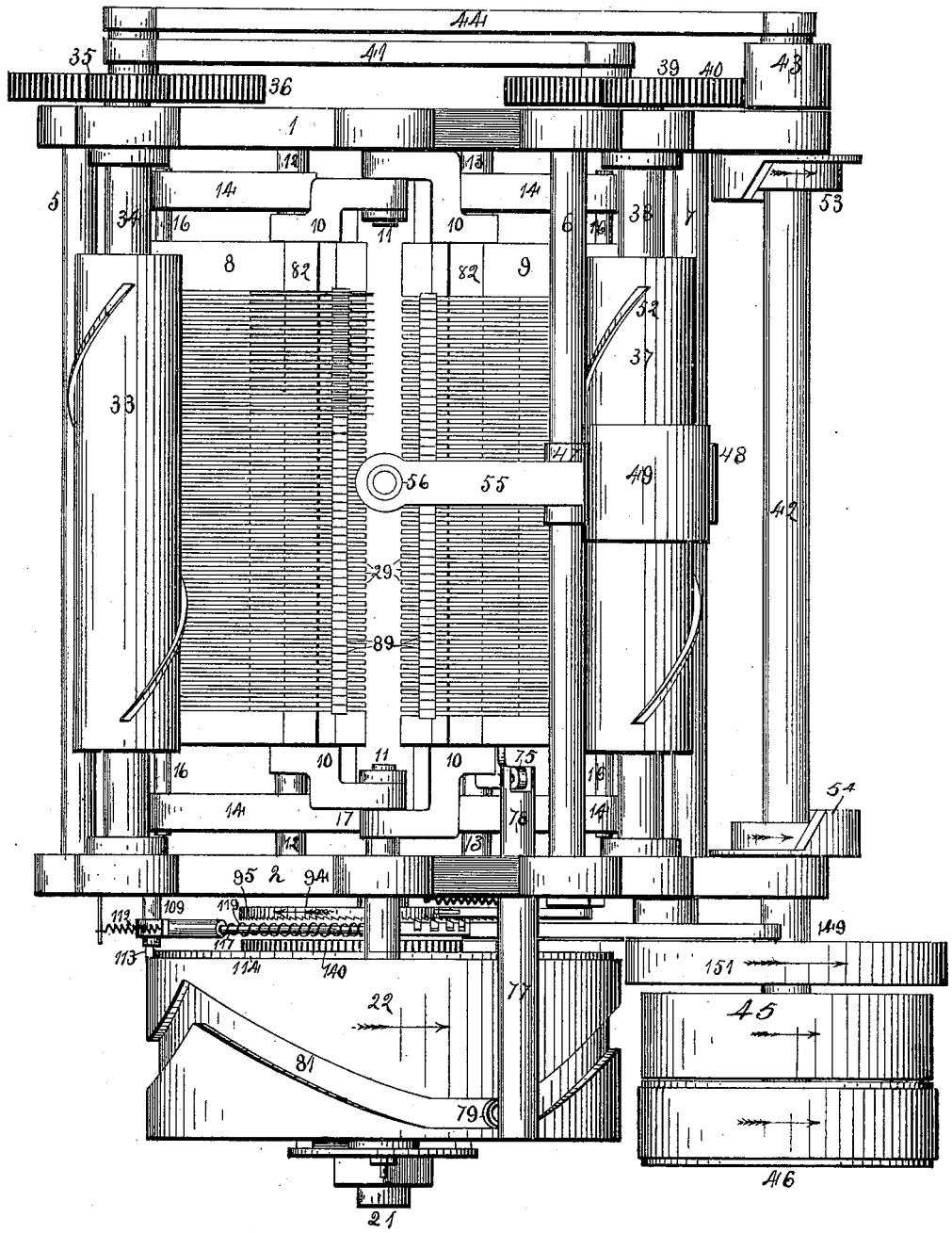
Figure 2:
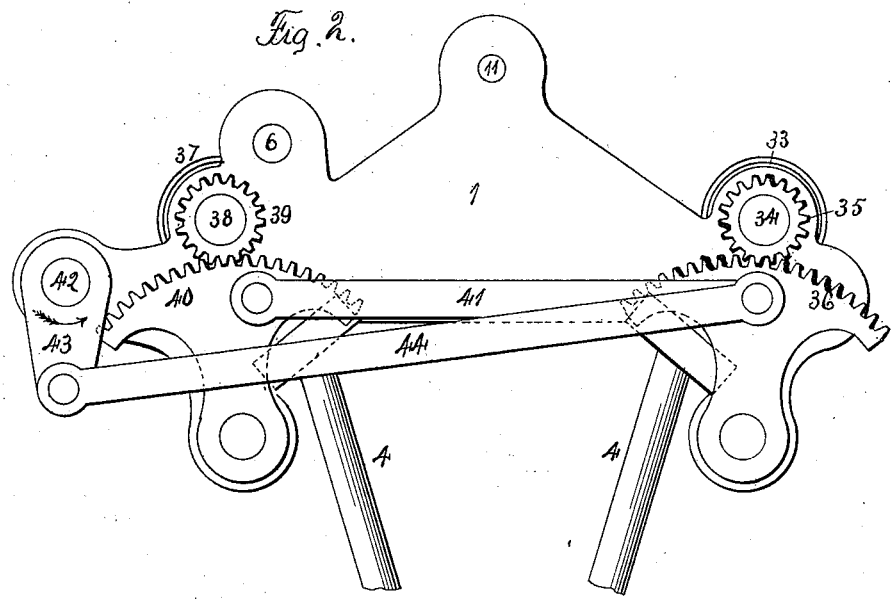
Figure 3:
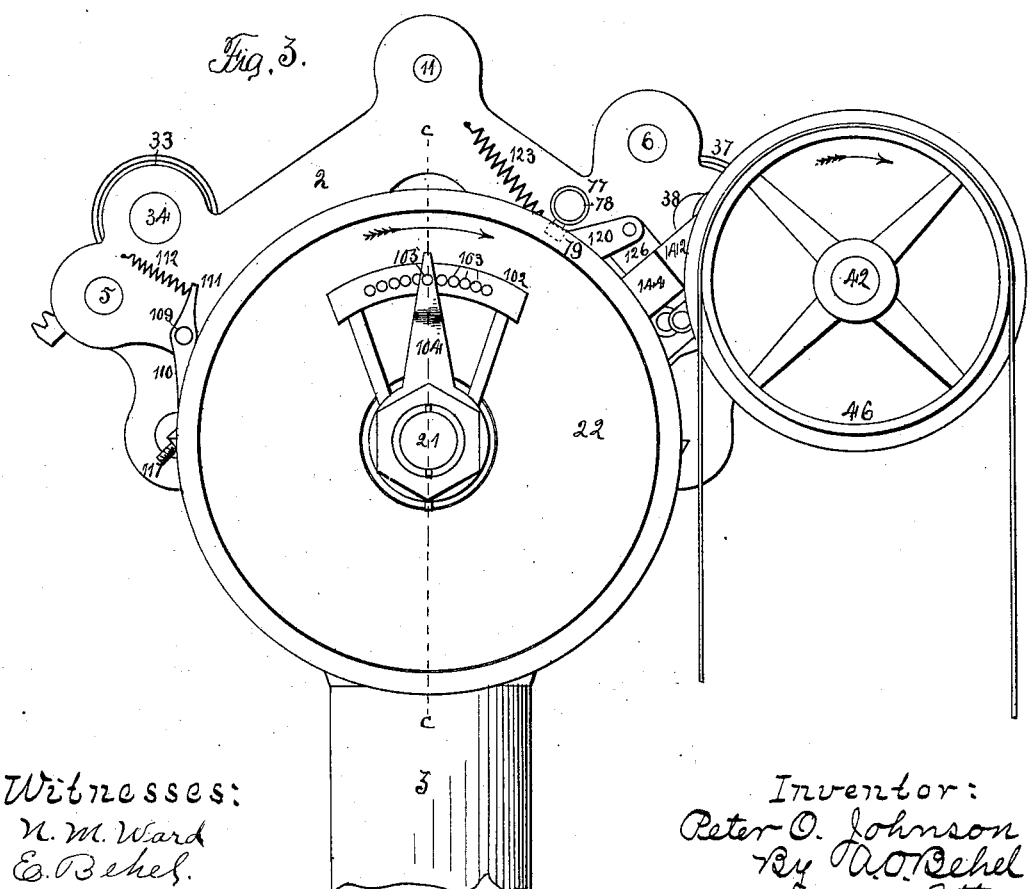
Figures 9, 10:
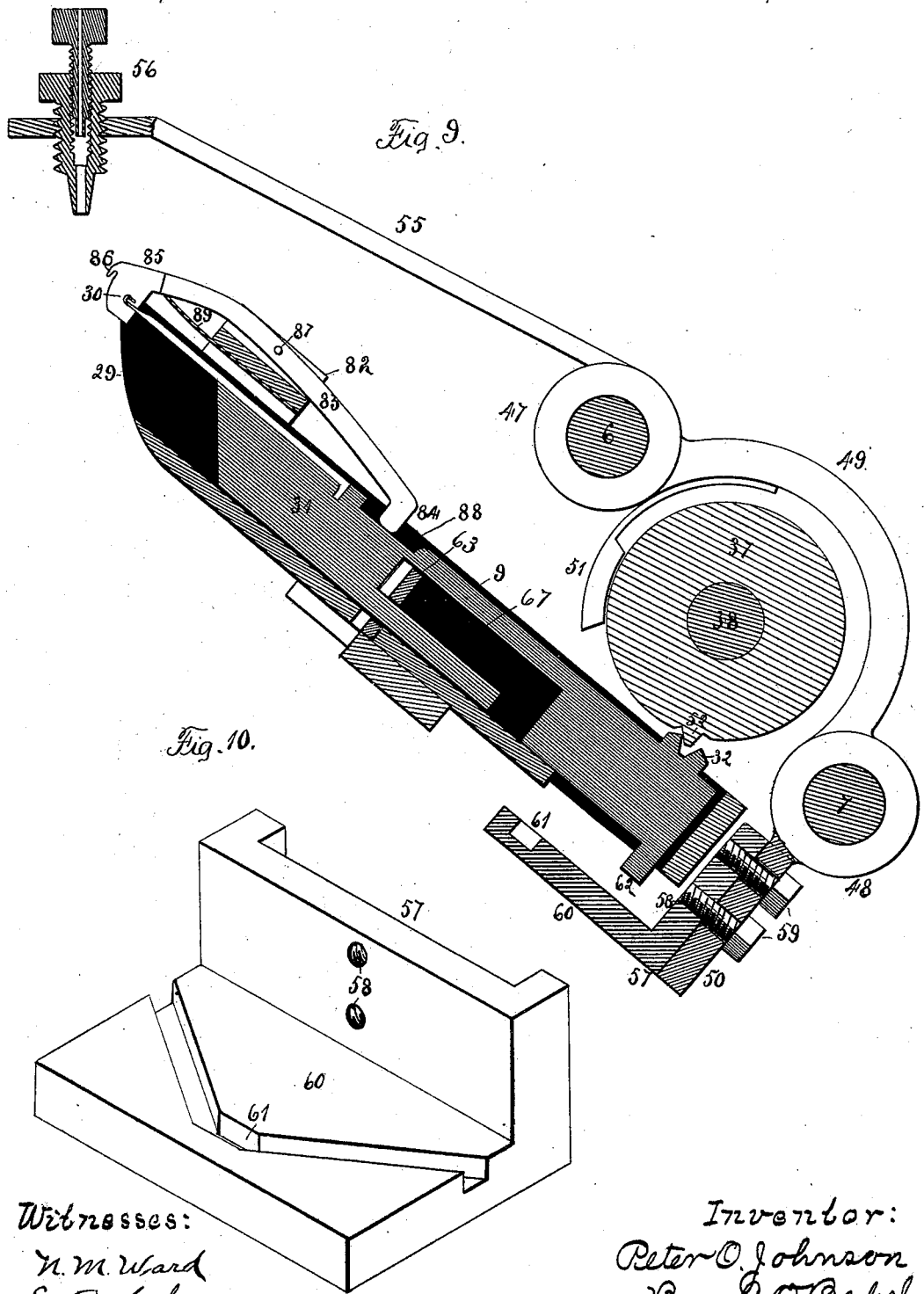
Figure 21:
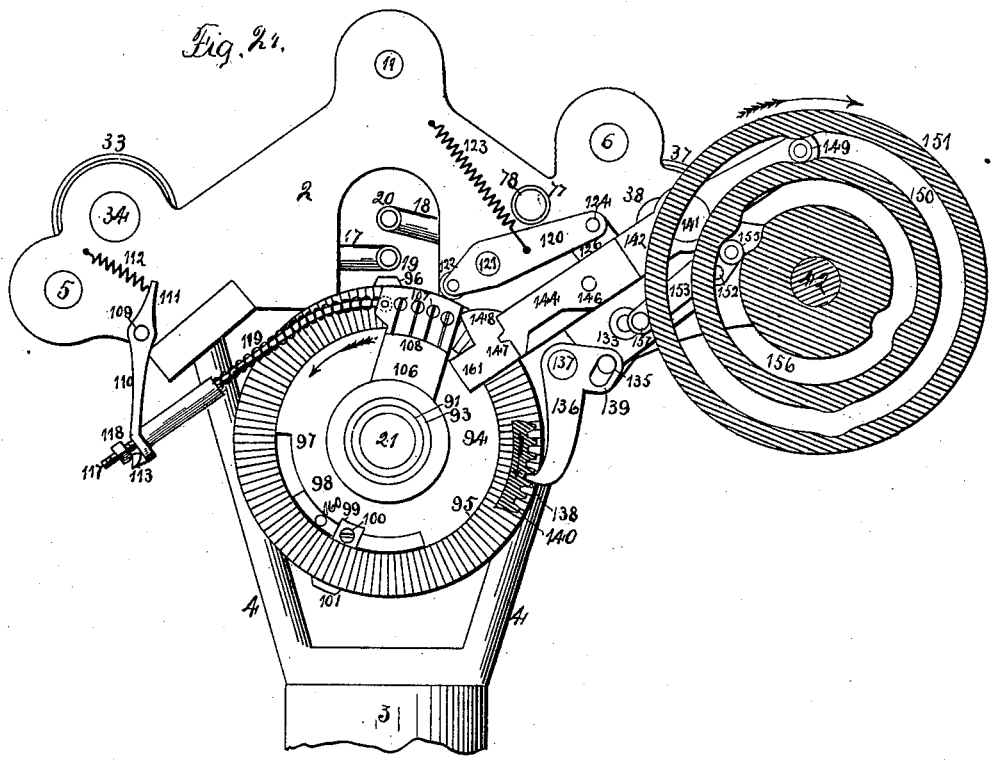
Figure 22:
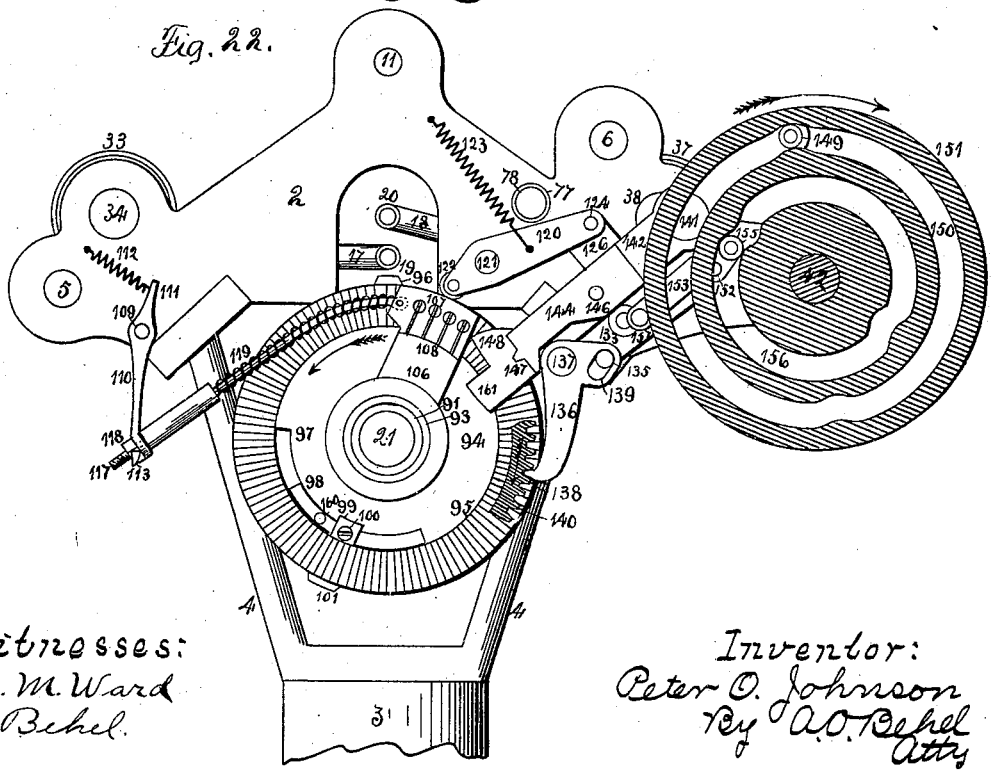
Figure 25:
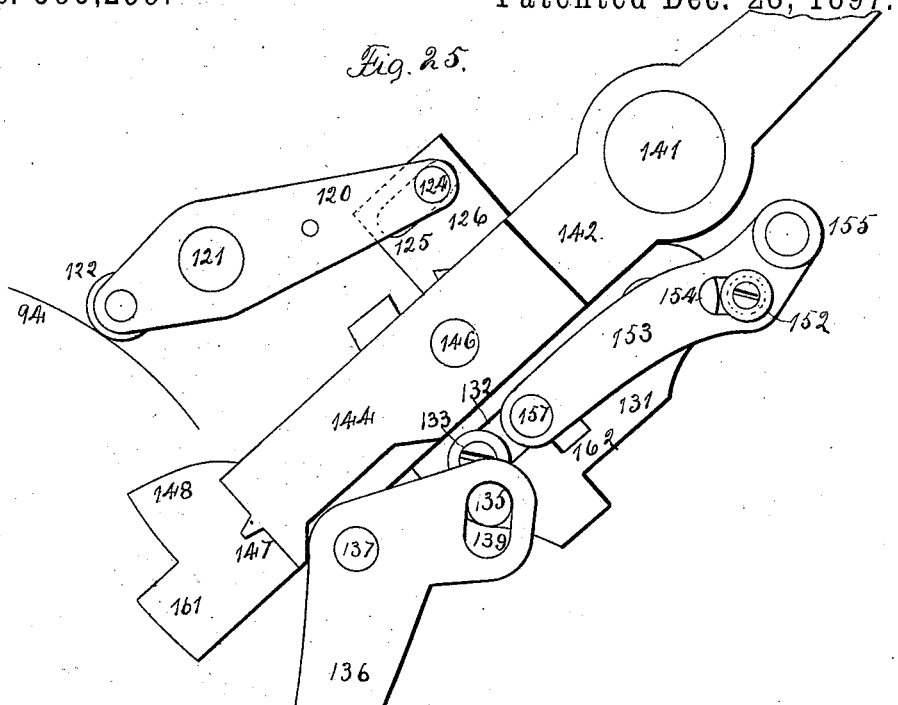
Figure 26:
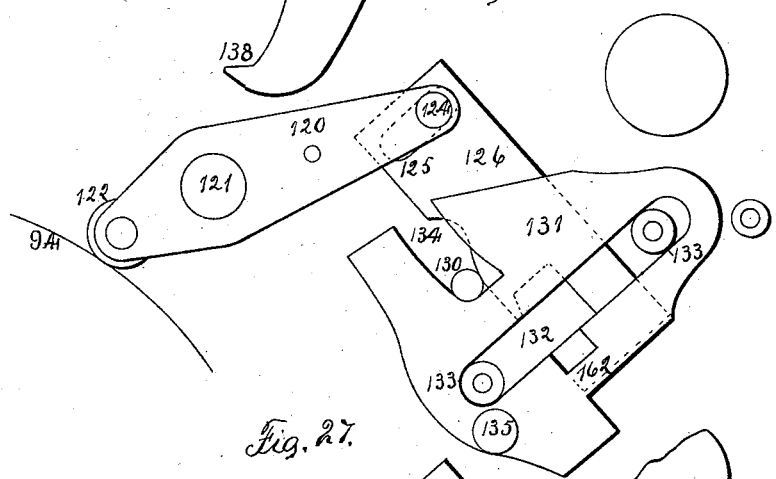
Figure 27:
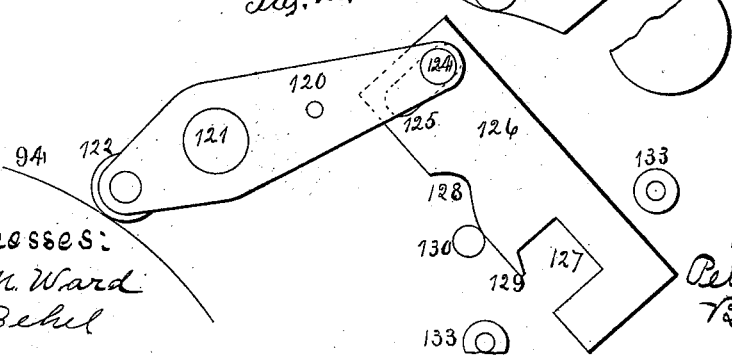

In the accompanying drawings, Figure 1 is a plan view of my improved knitting-machine. Fig. 2 is an end elevation showing the mechanism for operating the spirally-ribbed rollers. Fig. 3 is an elevation of the opposite end to that shown at Fig. 2. Fig. 4 is an elevation with the end removed, showing the needle-beds in their elevated position. Fig. 5 is an elevation similar to that shown at Fig. 4, in which the needle-beds are lowered. Fig. 6 is a fragmental section of a portion of the spirally-ribbed roller 37 and the means for moving the yarn-carrier. Fig. 7 is an under face view of the needle-bed 9. Fig. 8 is a lengthwise section of the needle-bed 9 on dotted line a, Fig. 7, not inverted. Fig. 9 is a transverse section of the needle-bed 9 on dotted line b, Fig. 7, also through the yarn-carrier and the cam carried thereby. Fig. 10 is an isometrical representation of the cam for operating the fashioning-needles. Fig. 11 is a development of the pattern-wheel, showing the cam-groove for operating the fashioning-needles. Fig. 12 is a vertical section on dotted line c, Fig. 3. Fig. 13 is an inner face representation of the pattern-wheel. Figs. 14 and 15 are inner face representations of a portion of the pattern-wheel, showing the different portions of the projection 113. Fig. 16 is a lengthwise central section through the lever 142 and the parts connected therewith. Fig. 17 is an isometrical representation of a portion of the bar 126, as seen from its inner face. Fig. 18 is an isometrical representation of the latch 153, as seen from its inner face. Fig. 19 is a plan view of a fragment of the disk 94 and top of the arm 106. Fig. 20 is a section through one of the spring-actuated pawls. Figs. 21 and 22 are end elevations of the machine, in which the pattern-wheel has been removed and showing a section through the cam-wheel 151 and the mechanism and position of the parts for intermittently rotating the disk 94. Figs. 23 and 24 are views similar to Figs. 21 and 22, showing its parts for imparting an intermittent rotary motion to the pattern-wheel. Figs. 25, 26, and 27 are elevations of the mechanism for intermittently rotating the disk and pattern-wheel. Fig. 28 is an isometrical representation of the bar 63. Fig. 29 is an isometrical representation of the bar 64.

The main frame of my knitting-machine consists of two vertical ends 1 and 2, supported from a pedestal 3 by arms 4 and held separated by rods 5, 6, and 7. Two needle-beds 8 and 9 are supported between the vertical ends of main frame by brackets 10, secured to the needle-beds and having a pivotal connection at their upper ends with the studs 11, extending inward from the upper central portions of the frame. These beds are supported in a manner to be moved upon their pivotal connections with the main frame, and their movements are governed by a pattern-wheel. The means for forming this connection consist of two transverse shafts 12 and 13, supported to oscillate in their connection with the main frame and located beneath the needle-beds. To each end of these shafts is secured an arm 14, having a slot 15 in its outer end, a pin 16 for each slot extending from the needle-beds near their free ends and engaging the slots, this forming a connection between the needle-beds and shafts 12 and 13. One pair of these arms have outward extensions 17 an 18, projecting through an opening in one of the ends of the main frame and supporting rollers 19 and 20 on their ends.

In the outer face of the end 2 of the main frame is secured a stud 21, which supports a pattern-wheel 22 in a manner free to rotate. The inner face of this pattern-wheel is provided with two concentric grooves 23 and 24, the inner one having cams 25 and 26 and the outer one having cams 27 and 28.

The roller 20, having a connection with the needle-bed 9, is located in the outer concentric groove 24, and the roller 19, having a connection with the needle-bed 8, is located in the inner concentric groove 23. The pattern-wheel is intermittingly rotated in the direction indicated by the arrow by mechanism to be hereinafter described. Such movement will cause the rollers 19 and 20 to approach the center of the pattern-wheel when the cams of the concentric grooves are encountered, thereby moving the needle-beds upon their pivotal connection with the main frame, causing their lower ends to be elevated. Their elevated position is shown at Fig. 4, and their depressed position is shown at Fig. 5.

The needle-beds are provided with needle-grooves 29, within which are located needles 30 and their jacks 31 and are capable of moving in the lengthwise direction of the grooves. The jacks have a slotted projection 32, extending above the upper face of the needle-bed. Over the lower end of the needle-bed 8 is located a roller 33, supported upon a shaft 34, the shaft supported by the main frame in a manner to revolve. Upon one end of the shaft is secured a pinion 35, and a toothed segment 36 has a pivotal connection with the main frame and meshes with the pinion 35.

Over the lower end of the needle-bed 9 is located a roller 37, supported upon a shaft 38, the shaft supported by the main frame in a manner to revolve. Upon one end of the shaft is secured a pinion 39. A toothed segment 40 has a pivotal connection with the main frame and meshes with the pinion 39. The toothed segments are connected by a link 41.

The main driving-shaft 42 is supported by the ends of the main frame, and to one end is secured a crank 43, its free end having a connection with the toothed segment 36 by a link 44. This shaft supports a tight pulley 45 and loose pulley 46 and is rotated in the direction indicated by the arrows. The rotation of this main driving-shaft will impart an oscillating movement to the toothed segments through the link connection, and the toothed segments will impart a reversible rotary movement to the spirally-ribbed rollers 33 and 37, and the spiral ribs of the rollers will engage the slotted projections of the jacks, thereby raising and lowering the needles during the knitting process.

A yarn-carrier 55, movable across the knitting-machine, has two sockets 47 and 48, supported upon rods 6 and 7, respectively, and joined by an arch-bar 49, and from the lower socket 48 extends a projection 50. The inner face of the arch-bar has a projection 51, (shown at Figs. 6 and 9,) which overlies the roller 37. By the movement of the roller 37 in one direction the spiral rib 52 will engage the projection 51, thereby moving the yarn-carrier across the machine and with sufficient force to free the projection of the rib in order that the spirally-ribbed roller may reverse its movement. In order that the yarn-carrier may be returned by the reverse movement of the spirally-ribbed roller, it will be necessary to move the yarn-carrier into engagement with the spiral rib at the end of each movement across the machine, and to accomplish this two cams 53 and 54 are secured to the main driving-shaft 42 inside of the ends of the main frame and are so located upon the shaft that when the yarn-carrier has been moved to one side of the spirally-ribbed roller and the roller has reversed its movement sufficiently to admit the projection 51 to enter on the opposite face of the spiral rib the cam located at that end of the roller will engage the end of the socket 48 and cause the yarn-carrier to slide upon the rods 6 and 7 toward the other end of the machine until the projection 51 will be operated upon by the spiral rib 52, when the movement of the spiral rib will carry the yarn-carrier to the opposite end of the machine, at which point the operation will be repeated by the cam at that end.

To the upper socket 47 of the yarn-carrier is secured an arm 55, supporting a vertically-adjustable yarn-guide 56.

To the projection 50 of the yarn-carrier is secured the needle-operating cam shown at Fig. 10, consisting of the recessed end 57, having screw-threaded openings 58, receiving screws 59, which pass through openings in the projection 50, thereby clamping the cam to the projection. An extension 60 has a cam-groove 61 formed in its upper face. This extension is located underneath the free end of the needle-bed 9, as shown at Fig. 9. This cam being a part of the yarn-carrier is movable therewith across the machine and operates the fashioning-needles in a manner now to be described.

The needle-bed 9 when in its elevated position holds the needle-jacks in position to be operated upon by the spiral rib 52 of roller 37, and upon the needle-bed being lowered the projections 62 of the needle-jacks will be operated upon by the cam-groove 61, thereby raising and lowering the needles during the knitting process.

In the grooves of the needle-bed 9 are located fashioning-needles, in this instance consisting of twenty-three needles at each end of the bed, and a center series, in this instance consisting of twenty-two needles, remaining in action when the machine is running.

After the needle-bed 9 has been lowered the needles of the two outside series are alternately raised from engagement with the cam-groove 61, in order that they may be held out of knitting action, and the means for accomplishing this consists of two bars 63 and 64, provided with lengthwise cam-grooves 65 and 66, respectively, as shown at Figs. 8, 28, and 29. The jacks of the two outside series are the same, one of them being shown at Fig. 9, wherein a central slot 67 is formed which receives the upper portions of the bars, thus forming a connection between the bars and needle-jacks. As the bars are moved in their lengthwise direction the cam-groove thereof will cause the needle-jacks to be raised or lowered, according to the direction in which the bars are moved. At Fig. 9 they are shown elevated and the projection 62 free from engagement with the cam-groove 61 and the needle-jack in engagement with spiral rib 52 of the roller 37.

At Fig. 7 is shown an under face representation of the needle-bed 9 and the mechanism for moving the bars 63 and 64 in their lengthwise direction. To the bar 63 is connected a frame composed of the toothed rack 68 and ends 69, and to the bar 64 is connected a toothed rack 70 and ends 71. A toothed wheel 72 has a pivotal connection with the under face of the needle-bed and meshes with the toothed racks 68 and 70. The toothed racks have a lengthwise slot 73, through which screws 74 pass into the needle-bed, forming a guide for the bars in connection with end cleats, holding them in contact with the needle-bed. The bar 63 has an upturned end 75, provided with a lengthwise slot 76.

A tubular shell 77 is supported by the end 2 of the main frame and extends over the periphery of the pattern-wheel 22. A plunger 78 is located within this shell, having an outer end supporting a roller 79. The inner end of this plunger is forked, and between the arms of the fork is located the upturned end 75 of the bar 63, and a pin 80, passing through the slot 76 of the upturned end, forms a connection between the bar and plunger. The periphery of the pattern-wheel has a cam-groove 81 formed therein. (Shown in an outstretched position at Fig. 11.) The roller 79 of the plunger 78 is located within this cam-groove. As an intermittent rotary movement is imparted to the pattern-wheel, as before stated, the roller 79 will be moved in the lengthwise direction of the plunger, which will move the bar 63, and, by reason of its gear connection with the bar 64, will also impart a lengthwise movement to this bar, and the movement of these bars will operate the needle-jacks in the manner before stated.

The slot 76 is employed to permit the movement of the needle-bed 9 without breaking the cam connection between plunger and bar 63.

To the upper end of each needle-bed and extending across the same is secured a ribbed bar 82, the grooves thereof corresponding with the needle-grooves of the needle-beds, and when the machine is fully equipped there is located in each of these grooves a thread-hook, (shown at Fig. 9,) consisting of the main portion 83, a depending lower end 84, and an enlarged upper end 85, provided with a hook 86. The depending lower end and the enlarged upper end are located in the same needle-groove and are held in position by a wire 87, extending through the ribs of the bar 82 and through the main portion 83, which forms a pivot for the thread-hook. The upper edge of each needle-jack 31 has a recess 88 extending in the lengthwise direction of the jack, within which the depending end 84 of the thread-hook is located when the needles are lowered. To the under face of the ribbed bar 82 are secured flat springs 89, one for each thread-hook, and which extend toward the enlargement 85. When the needles are raised during the knitting process, the thread-hook will be moved upon its pivotal support by the end of the recess 88 moving under the depending end 84, and upon the lowering of the needles the depending end will enter the recess by reason of the action of its spring. The hook 86 will enter a stitch and force it down at each movement of the knitting-needle. The enlarged end 85 is somewhat thinner than the remaining portion of the thread-hook and lies alongside the hooked end of the knitting-needle and will not in any manner interfere with the operation of the needles.

The mechanism for imparting an intermittent rotary movement to the pattern-wheel and for determining when such movement shall be commenced and stopped will now be explained.

Upon the stud 21, supporting the pattern-wheel, is located a sleeve 91, having an arm 92 at its inner end. Upon this sleeve is located a shell 93, supporting a disk 94, having its outer face provided with radial saw-toothed notches 95 and its periphery provided with a stationary projection 96. A concentric slot 97, cut through the disk, receives a stud 98, extending from the arm 92, and a plate 99, connected to the stud by screw 100, forms a connection between arm 92 and disk 94. This arm 92 has a projection 101 which overlies the periphery of the disk.

To the upper end of the shell 93 is connected a segment 102, provided with a series of holes 103, and a pointer 104 has a connection with the sleeve 91. This pointer and segment are connected by a pin 105, and their position may be adjusted with respect to each other by means of the series of holes. As the projection 101 has a fixed relation with the pointer 104, its position over the periphery of the disk 94 may be changed, for a purpose to appear hereinafter.

Upon the shell 93 is located an arm 106, which overlies the toothed face of the disk 94 and supports a series of dogs 107, each actuated by a spring 108, holding them in contact with the teeth of the disk. This arm is so mounted upon the shell as to oscillate thereon, and the dogs are located so that only one dog at a time will engage a tooth of the disk, and the distance between the teeth is such that some one of the dogs will engage a tooth of the disk by a movement of the arm not to exceed one-fourth of the face of a tooth.

From the main frame extends a stud 109, upon which is pivoted an arm having a depending end 110 and an upwardly-extending end 111. A spring 112 connects the upwardly-extending portion with the main frame in a manner to hold the depending end toward the center of the pattern-wheel. The depending end has a projection 113, extending outwardly, which is located in an annular recess 114, formed in the periphery of the inner end of the pattern-wheel. This recess has two depressions 115 and two projections 116, located diametrically opposite each other, as shown at Figs. 13, 14, and 15. The lower end of the depending end 110 of the pivoted arm supports a rod 117, having its end screw-threaded and receiving a nut 118, the other end of this rod having a pivotal connection with the arm 106 and surrounded by a coil-spring 119.

On the outer face of the end frame 2 is located the mechanism for imparting movement to the pattern-wheel and the tooth-faced disk, which consists of a lever 120, pivoted upon a stud 121 and supporting at one end a roller 122, which runs in contact with the periphery of the disk 94. A spring 123, connected at one end to this lever and at its other end to the main frame, holds the roller 122 in contact with the disk in a yielding manner. The other end of this lever has a stud 124, extending inward and located in an elongated slot 125 of a slidable bar 126, which has a rectangular notch 127 and curved depression 128 in one edge. The open side of the notch 127 has a projection 129 of less thickness than the thickness of the bar, an under face representation of this bar being shown at Fig. 17. A stud 130, extending from the main frame, forms a guide for the bar 126. A plate 131 has a slot in its under face to receive the bar 126, also a slot 132, guided by studs 133, extending from the main frame. A curved slot 134 extends inward from the upper face of the plate, and a stud 135 extends outwardly from the lower end of the plate.

A dog 136 has a pivotal connection with the main frame upon the stud 137, having its lower end provided with a tooth 138. An elongated opening 139 is formed in the dog and receives the stud 135, extending from the plate 131. This dog engages the teeth of a ring 140, made a part of the pattern-wheel and located on its inner face, and acts as a stop, preventing the rotation of the pattern-wheel.

From the main frame extends a stud 141, supporting a lever 142 in a pivotal manner. The larger end of this lever has upon its upper side an open lengthwise slot 143, (shown at Fig. 16,) within which is guided a movable dog 144, a pin 145 holding the dog in position and allowing it a limited lengthwise movement. A stud 146 extends inward from the dog and enters the curved slot 134 of the plate 131. A projection 147 extends from the lower end of the dog and is fitted to enter between the teeth of the toothed ring 140 of the pattern-wheel, and the adjacent end of lever 142 has an enlargement 148, for a purpose to appear hereinafter. The other end of this lever supports a roller 149, which is located in a cam-groove 150 of a wheel 151, secured to the main driving-shaft 42 and rotatable therewith in the direction indicated by the arrows.

A stud 152 extends from the main frame and supports a latch 153 by the elongated opening 154 receiving the stud, allowing a sliding movement upon the stud and moving its free end in the lengthwise direction of the slot 132. One end of this latch supports a roller 155, which is located in a cam-groove 156 of the wheel 151. The other end of this latch has a stud 157 extending from its inner face, having a notch 158 near its end, as shown at Fig. 18. This stud is located in the opening 132 of the plate 131, and when the parts are in the position shown at Figs. 25, 26, and 27 the stud will move freely in the opening and run idle, the cam-groove 156 imparting this movement to the latch.

When the roller 122 of the lever 120 runs in contact with the periphery of the disk 94, the parts will be in the position shown at Figs. 25, 26, and 27. The cam 150 will impart an oscillatory movement to the lever 142, and the extent of the movement is shown at Figs. 21 and 22, and in said figures the enlarged end 148 of the lever coming in contact with the arm 106 imparts an intermittent rotary movement to the toothed disk 94 in the direction indicated by the arrow. The coil-spring 119 will cause the arm 106 to follow it, securing a new engagement with the disk. This movement is repeated at each movement of the lever so long as the roller 122 runs in contact with the periphery of the disk 94. By means of the nut 118 the distance between the nut and the connection between the rod 117 and arm 106 may be varied, and if shortened the arm 106 will be moved a less distance, and consequently the disk will be advanced a less distance. The projection 113, lying in the recess 115 of the pattern-wheel, limits the movement of the arm by the action of the spring 112. The object in rotating the disk 94 is to bring either of the projections 96 and 101 under the roller 122 of the arm 120, and while the disk is being intermittingly rotated the dog 136 will engage the toothed ring 140, preventing the rotation of the pattern-wheel, and the slidable dog 144 is held out of reach of the teeth of the toothed ring during this movement of the lever 142.

In order to force the projections 96 and 101 under the roller 122, I have provided a spring-actuated plunger 159, (shown in section at Fig. 20,) located in the face of the disk 94, and one, 160, located in the block 98, movable in the curved slot 97. As the disk is intermittingly rotated by the lever 142 one of the plungers will be forced under the extreme end 161 of the lever, its spring-support allowing it to do so, when it will spring out in the path of the end of the lever, and the lever will encounter the plunger, thus forming a direct connection between the lever and disk in addition to the connection between the lever and arm 106, and this continued leverage will force the disk ahead sufficiently to force the projection 96 under the roller 122 against the action of the spring 123.

When the lever 120 is moved, it will force the bar 126 downward in its connection with the plate until the stud 130 is received in the curved recess 128, which will allow the bar by its own gravity to move toward the center of the pattern-wheel, carrying the plate 131 with it. The lower edge of the lengthwise opening 132 of the plate 131 has a notch 162, within which the stud 157 of the latch 153 is received when the bar 126 is lowered and the plate moved toward the center of the pattern-wheel, and the projection 129 of the bar will enter the notch 158 of the projection after the stud 157 is in notch 162, thus forming a connection between the latch 153 and bar 126 and preventing sidewise movement of the latch at this point, and as the bar 126 is guided in the slot in the inner face of the plate 131 a connection is formed between the latch and plate 131 through the bar 126. Before this connection the stud 157 moved idly in the slot 132 without moving the plate 131. At the time the projection 96 is forced under the roller 122 the lever 142 will be at the upper end of its movement, and the movement of the bar 126 will allow the dog 144 to engage one of the teeth of the toothed ring 140 and at the same time disengage the dog 138 from engagement with the toothed ring. The latch 153 is operated by its cam-wheel, which moves the plate 131, which in turn operates upon the dog 136. Upon the end of the lever carrying the dog 144 downward it will advance the pattern-wheel one tooth, which will be sufficient to move the projection 113 out of the recess 115 (shown at Fig. 13) into the periphery of the annular rib 114. (Shown at Fig. 14.) This movement forces the arm 106 out of reach of the movement of the enlarged end 148 of the lever 142, as shown at Fig. 24, which will prevent movement being imparted to the disk 94. At the upward movement of the lever 142 the dog 144 will be disengaged and the dog 136 will become engaged with the teeth of the toothed ring. This movement is accomplished by the cam-groove 136 of the cam-wheel 151 drawing upon the latch 153, which in turn draws upon the plate 131, and as the stud 146, extending from the dog 144, is located in the curved notch 134 of the plate 131 this dog is moved with the movement of the latch. After the pattern-wheel has completed one-half a revolution the projection 116 will encounter the projection 113, thereby forming a connection between the pattern-wheel and disk 94 through the arm 106, which will move the disk 94, carrying the projection 96, from under the roller 122 and allow the projection 113 to enter the recess 115, thereby allowing the arm to approach sufficiently to be operated upon by the enlarged end 148 of the lever 142 to again rotate the disk. As the roller 122 assumes its original position in contact with the periphery of the disk 94 the other parts of the mechanism will be returned to their original position.

The position of the projection 101, overlying the periphery of the disk 94, may be changed with respect to the projection 96 by moving the pointer 104. While the disk is being rotated, the needles of both needle-beds are knitting, consequently making tubular work, and the length of the tubular knitting depends upon the number of times the needles are operated during the movement of the disk between the projections 96 and 101.

When the stocking is commenced, the pattern-wheel 22 is in the position shown at Fig. 13. The pattern-wheel will then be moved three notches, which will drop both needle-beds, so that their needles will not be operated upon by the spirally-ribbed rollers, and the jacks of the needle-bed 9 will be dropped into engagement with the cam shown at Fig. 10, and as the pattern-wheel is intermittently rotated the slides 63 and 64 will be moved by the groove in the periphery of the pattern-wheel, which will throw out of action the fashioning-needles supported by the bed 9 until the pattern-wheel has moved one-fourth of a revolution, when the continued movement of the pattern-wheel for another one-fourth revolution will return the jacks of the fashioning-needles of bed 9 to the action of the reciprocating cam, completing the knitting of the toe of the stocking, when the rollers 19 and 20, supported by the arms 17 and 18, connected to the needle-beds 8 and 9, will move into the depressions 26 and 28 of the cams 23 and 24, thereby raising the needle-beds, so that all of the needle-jacks will be operated upon by the spirally-ribbed rollers, and at this point the pattern-wheel will remain inoperative, and the toothed disk 94 will be intermittently rotated a sufficient distance to complete the circular work between the toe and heel of the stocking, when the toothed disk will come to a standstill and the pattern-wheel again be rotated one-half revolution, forming the heel of the stocking, after which the pattern-wheel will again become inoperative and the toothed disk rotated a sufficient distance to complete the knitting of the leg of the stocking. The means for imparting movement to the pattern-wheel and toothed disk have before been described.

I claim as my invention—

1. In a knitting-machine, the combination of a supporting-frame, two needle-beds having a pivotal connection with the frame at a common center at the point where the needles cross, and supporting knitting-needles, means located over the needle-beds near their free ends for raising and lowering the needles during the knitting process and means for moving the beds upon their pivots toward and from the needle-operating means.

2. In a knitting-machine, the combination of a supporting-frame an intermittent rotary pattern-wheel, two needle-beds having a pivotal connection with the frame, mechanism between the beds and frame for moving them, one of the beds supporting fashioning-needles, mechanism between the fashioning-needles and pattern-wheel whereby their throwing in and out movements are controlled, an intermittent rotary disk and mechanism between the disk and pattern-wheel for determining the length of tubular knitting.

3. In a knitting-machine, the combination of a supporting-frame, two needle-beds having a pivotal connection with the frame and supporting knitting-needles, means for raising and lowering the needles during the knitting process, a pattern-wheel, connections between the beds and pattern-wheel for moving the beds toward and from the needle-operating means, a cam-wheel, a lever operated by the cam-wheel carrying a slidable pawl adapted to engage the pattern-wheel for imparting an intermittent rotary movement thereto.

4. In a knitting-machine, the combination of a supporting-frame, a needle-bed supporting fashioning-needles having a movable connection with the frame, devices located on both sides of the bed for raising and lowering the needles during the knitting process and means for moving the needle-bed so that the needles may be operated by either device.

5. In a knitting-machine, the combination of a supporting-frame, a needle-bed supporting fashioning-needles having a movable connection with the main frame, devices located on both sides of the bed for raising and lowering the needles during the knitting process, and means for holding the needles out of action.

6. In a knitting-machine, the combination of a supporting-frame, two needle-beds supporting knitting-needles, one bed supporting fashioning-needles, means for raising and lowering the needles during the knitting process, a stud extending from the main frame, an intermittent rotary pattern-wheel supported by the stud, mechanism between the pattern-wheel and fashioning-needles, whereby their action is controlled, a serrated-face disk supported upon the stud capable of an intermittent rotary movement, a pawl supported upon the stud capable of engaging the serrations of the disk, means for moving the pawl and means for varying the extent of its movement.

7. In a knitting-machine, the combination of a supporting-frame, two needle-beds supporting knitting-needles, jacks connected to the needles, their upper edge formed with a depression, a thread-hook having a pivotal connection with the needle-bed and located in the needle-groove, one end lying in the depression of the jack and the other end formed with a hook and lying alongside the needle and a spring for each thread-hook.

8. In a knitting-machine, the combination of a supporting-frame, two needle-beds, a yarn-carrier, a spirally-ribbed roller means for imparting a reciprocating rotary movement to the roller, a connection between the roller and yarn-carrier, a driving-shaft and a cam located upon the shaft at each end of the spirally-ribbed roller.

9. In a knitting-machine, the combination of a supporting-frame, an intermittent rotary pattern-wheel, two needle-beds having a pivotal connection with the frame and supporting knitting-needles, a disk for determining the length of the tubular knitting means for actuating the disk, intermediate devices controlling the action of the fashioning-needles, provisions whereby the disk determines the starting of the pattern-wheel, and provisions whereby the pattern-wheel determines the starting of the disk.

10. In a knitting-machine, the combination of a supporting-frame, an intermittent rotary pattern-wheel, two needle-beds having a pivotal connection with the frame, and supporting knitting-needles, a disk for determining the length of the tubular knitting means for actuating the disk, intermediate devices controlling the action of the fashioning-needles, provisions whereby the disk determines the starting of the pattern-wheel, provisions whereby the pattern-wheel determines the starting of the disk, the provisions being made adjustable.

11. In a knitting-machine, the combination of a supporting-frame, a pattern-wheel, two needle-beds supporting knitting-needles connections between the needle-beds and pattern-wheel, a serrated-face disk, a pawl engaging the serrations of the disk, a cam-wheel, a lever operated by the cam-wheel imparting movement to the pawl, a rod having a pivotal connection with the pawl at one end, an arm having a pivotal connection with the supporting-frame, and supporting the free end of the rod, a spiral spring surrounding the rod between the arm and pawl, a spring holding the arm in contact with the periphery of the pattern-wheel and the pattern-wheel provided with a projection operating upon the arm.

12. In a knitting-machine, the combination of a supporting-frame, a stud extending from the frame, a pattern-wheel two sleeves supported upon the stud, one sleeve having a disk connection thereto, and the other sleeve having an arm supporting a projection overlying the periphery of the disk, an adjustable connection between the two sleeves, means for moving the disk and provisions whereby a connection may be formed between the disk and pattern-wheel.

13. In a knitting-machine, the combination of a supporting-frame, an intermittent rotary pattern-wheel, an intermittent rotary disk, a pawl for imparting movement to the disk, means for actuating and controlling the pawl, connections between the wheel and disk consisting of a pivoted lever, a slidable bar, a plate and a lever supporting a movable dog, the pivoted lever operated by a projection extending from the disk, the plate holding the dog out of engagement with the pattern-wheel until the plate is allowed to move by the movement of the slidable bar, the lever supporting the movable dog oscillated by a cam-wheel.

14. In a knitting-machine, the combination of a supporting-frame, a pattern-wheel, a disk, means for moving the disk, connections between the pattern-wheel and disk consisting of a lever having a pivotal connection with the supporting-frame and operated by a cam-wheel, a dog having a sliding engagement with the lever having a stud extending inward therefrom, a plate located between the lever and supporting-frame, and movable upon supports having a recessed under face, a slidable bar located in the recess, a pivoted lever having one end connected to the slidable bar and its other end resting upon the periphery of the disk, a latch operated by the cam-wheel and engaging the plate, the stud extending inward from the lever located in a curved slot in the plate and a dog having a pivotal connection with the frame and with the plate and engaging the pattern-wheel.

15. In a knitting-machine, the combination of a supporting-frame, two needle-beds having a pivotal connection with the supporting-frame, a pattern-wheel having two concentric grooves on its face, each groove provided with two cams, two arms one end of each of which is connected with a needle-bed and the other end in engagement with one of the grooves of the pattern-wheel and means for intermittently rotating the wheel.

16. In a knitting-machine, the combination of a supporting-frame, a pattern-wheel, a serrated-face disk, means for moving the disk by engaging its serrated face, two spring-actuated plungers supported by the disk, one made adjustable in its connection with the disk, a movable lever adjusted to engage the plungers thereby moving the disk and provisions whereby a connection may be formed between the disk and pattern-wheel.

PETER O. JOHNSON.

Witnesses:
 A. O. BEHEL,
 E. BEHEL.